United States Patent Office.

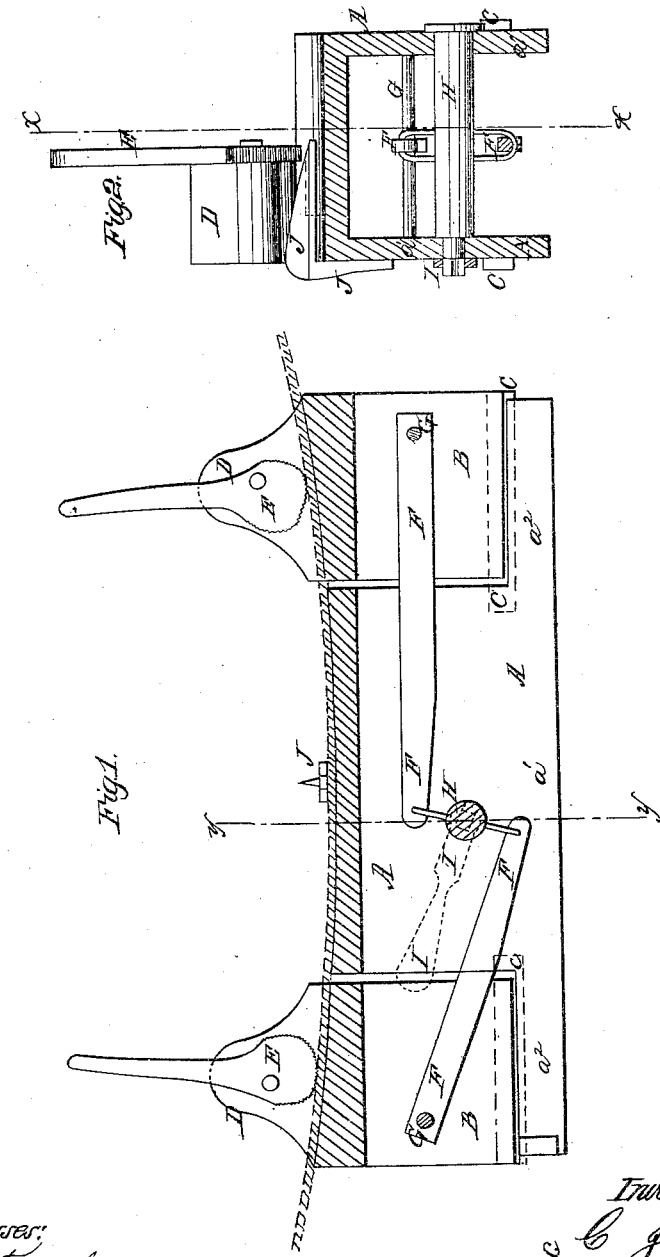

CALEB JACKSON, OF YORK, ILLINOIS.

Letters Patent No. 63,523, dated April 2, 1867.

---

IMPROVED MACHINE FOR SHRINKING TIRE.

---

*The Schedule referred to in these Letters Patent and making part of the same.*

---

TO ALL WHOM IT MAY CONCERN:

Be it known that I, CALEB JACKSON, of York, in the county of Clark, and State of Illinois, have invented a new and useful improvement in Machine for Shrinking Wagon Tire; and I do hereby declare that the following is a full, clear, and exact description thereof, which will enable others skilled in the art to make and use the same, reference being had to the accompanying drawings, forming a part of this specification, in which—

Figure 1 is a vertical longitudinal section of my improved machine, taken through the line $x\,x$, fig. 2.

Figure 2 is a vertical cross-section of the same, taken through the line $y\,y$, fig. 1.

Similar letters of reference indicate like parts.

My invention has for its object to furnish an improved tire-shrinking machine, simple in construction, effective in operation, and which can be operated by one man; and it consists in an improved tire-shrinking machine formed by the combination of the operating lever, shaft, and pivoted levers with each other, and with the movable and stationary parts of the machine, as hereinafter more fully described.

A is the stationary and B are the movable parts of the machine. The lower parts of the sides $a^1$, or frame of the stationary part A of the machine, extend out horizontally, as shown in fig. 1, so as to form arms, $a^2$, upon which the movable parts B may slide back and forth, said parts being kept in place by the guide-bars C, attached to either the said parts B or to the part A, as may be most convenient, and overlapping the other part, as shown in dotted lines in fig. 1. The upper surfaces of the parts A and B are so made as to correspond with each other, and are curved so as to conform to the general curvature of the tires to be shrunk. D are projections projecting upward from the movable parts B, and which are grooved or channelled on their lower sides, as shown in the drawings, to receive the edge of the tire. E are cams, pivoted to the sides of the projections D, the edges of which are grooved, and which, when turned down, come in contact with the surface of the tire and clamp it fast to the curved surface of the movable parts B. F are levers, the outer ends of which are pivoted to the movable parts B of the machine by a rod, G, passing through the sides of said parts, or by any other convenient means. The other or inner ends of the levers F are pivoted to the sides of the shaft H, so that by revolving the shaft H in one direction the movable parts B are drawn forward, and by turning it in the other direction the said parts are pushed back. I is a lever, attached to the projecting end of the shaft H, and by means of which the said shaft is operated. J is a stop or guard, attached to the side of the stationary part A, and which projects over the curved surface of said part so as to pass over the tire and prevent its rising or bulging when drawn upon by the movable parts B. This machine can be operated by one man, and with it a tire can be drawn three-fourths of an inch at one heat, thus requiring but one heating to shrink a tire.

Having thus described my invention, I claim as new, and desire to secure by Letters Patent—

An improved tire-shrinking machine formed by the combination of the operating lever I, shaft H, and pivoted levers F with each other, with the stationary part A and movable parts B of the machine, substantially as herein shown and described and for the purpose set forth.

CALEB JACKSON.

Witnesses:
WM. B. HODGE,
I. R. MILLER.